United States Patent [19]

Walker

[11] 4,277,569
[45] Jul. 7, 1981

[54] FIRE-RETARDANT FOAM

[75] Inventor: Benjamin M. Walker, Madison, Conn.

[73] Assignee: Sentinel Foam Products Incorporated, Hyannis, Mass.

[21] Appl. No.: 129,117

[22] Filed: Mar. 10, 1980

[51] Int. Cl.³ ............................................... C08J 9/14
[52] U.S. Cl. ................................. 521/92; 260/28.5 A; 260/45.75 B; 260/DIG. 24; 521/98; 521/143; 521/907
[58] Field of Search ............... 260/45.75 B, DIG. 24; 521/92, 907, 143

[56] References Cited
U.S. PATENT DOCUMENTS

| | | | |
|---|---|---|---|
| 2,590,211 | 3/1952 | Rugar | 260/45.75 B |
| 2,669,521 | 2/1954 | Bierly | 260/DIG. 24 |
| 2,894,918 | 7/1959 | Killoran et al. | 521/907 |
| 2,962,464 | 11/1960 | Field | 260/DIG. 24 |
| 2,986,535 | 5/1961 | Jacobson | 521/907 |
| 3,639,304 | 2/1972 | Raley, Jr. | 521/907 |
| 3,655,589 | 4/1972 | Wingler et al. | 521/907 |
| 3,929,689 | 12/1975 | Walton et al. | 521/92 |
| 4,182,799 | 1/1980 | Rodish | 521/907 |

*Primary Examiner*—Morton Foelak
*Attorney, Agent, or Firm*—Chapin, Neal & Dempsey

[57] ABSTRACT

A low-density fire-retardant foam for use in furniture padding, thermal insulation and the like comprising a foamable blend of a polymer, an antimony oxide and a halogenated compound.

7 Claims, No Drawings

FIRE-RETARDANT FOAM

BACKGROUND

This invention relates to fire-retardant foam for use as thermal insulation, padding in bedding, furniture and other articles.

For safety purposes, to reduce the risk of accidental fires, it is often sought to make building materials and consumer goods fire-proof or retardant. Such fire resistance is usually imparted to certain articles by adding fire-retardant additives, such as a mixture of antimony oxide and a halogenated compound, to the raw materials from which the article is manufactured. However, it has been found that most, if not all, known fire-retardant additives in the proportions in which they are most often employed are unsuitable for use in the manufacture of synthetic foams in that the additives adversely affect the system by which a synthetic foam blend is foamed. For example, it has been found that fire-retardant additives in particle form often adversely alter the nucleation of the foam, causing unwanted variations in the size, number and properties of the foam cells. Similarly, most fire-retardant additives may adversely affect the viscosity and melt strength of polymer constituents of the foam resulting in poor cell structure and cell collapse.

Accordingly, it is a principal object of the present invention to provide a fire-retardant, synthetic foam which overcomes the deficiencies of the prior art.

It is another object of the present invention to provide such a fire-retardant foam wherein properties of the principal polymer constituent thereof are not severely adversely effected by the fire-retardant addition.

It is a further object of the present invention to provide such a fire-retardant foam which may be formed in a variety of profiles for such diverse uses as building insulation, bedding and the like.

It is a further object to provide such a fire-retardant foam characterized by uniform cell properties.

It is another object to provide such a fire-retardant foam wherein fire resistance is achieved without sacrifice in the viscosity and melt strength of a polymer constituent of the foam.

It is yet another object of the present invention to provide such a fire-retardant foam which is of low density and therefore economical to manufacture.

DESCRIPTION OF THE PREFERRED EMBODIMENT

These and other objects which will become more readily apparent from the following detailed description are realized by the foaming of a heated mixture of a polymer, an antimony oxide and a halogenated compound in the presence of a nucleation system.

As is recognized by those skilled in the art, there are many so-called fire-retardant materials and systems which are employed in conjunction with polyolefins such as polyethylene. However, the products resulting therefrom are solid polymer products made by extrusion, injection molding or other similar processes, not foam products.

The basic problem with producing a fire-retardant foam residue is the fact that normal fire-retardant additives interfere with the foaming systems that are generally employed in foaming a polymer. There are a number of ways in which said fire-retardants adversely effect the foaming process and/or the final foam, basically, they give rise to poor cell structures.

The present invention involves the commonly used fire-retardant system comprising an antimony oxide plus a halogen compound such as a chlorinated paraffin wax. It is believed that it is necessary that both components be used in the system in that it is theorized that the halogen compound decomposes with heat liberating a halogen or a halogen acid which in turn reacts with antimony oxide to produce either antimony trihalide or antimony oxyhalide which are flame-retarding antimony species.

While the antimony/halogen system described above is commonly used, it has been found that in order to produce a low density fire-retardant polyolefin foam, it is necessary to deviate substantially from the accepted halogen to antimony ratios, i.e., 2:1 to 4:1 in order to minimize adverse effects on the foam by the presence of excessive amounts of solid particulate material, i.e., antimony. To this end, it has been found that a halogen to antimony ratio of about 7:1 to 9:1, preferably 8:1, is required in order to supply enough halogen to obtain maximum effective advantage of the antimony. Thus, the antimony compound level in the foam product produced is less than 1% which is significantly less than the 7% to 15% levels normally used in standard fire-retardant formulations.

The polymer employed in the practice of the invention is a polyolefin, such as polyethylene, and is employed in the foamable blend in an amount of at least 90% by weight. An example of such a polyethylene is Rexene PE 143 manufactured and sold by Rexene Polyolefins Co. It will be understood that the fire-retardant foam of the present invention may also be formed from other polyolefins and polyolefin copolymers which are compatible with the flame-retardant additives set forth hereinbelow.

As stated above, the fire-retardant system used in the present invention is the combination of an antimony oxide and a halogen compound such as a chlorinated paraffin. Typical chlorinated paraffins include Chlorowax 70 and 71 which are produced by the Diamond Shamrock Company.

In producing the low density fire-retardant foam of the present invention, typically a mixture comprising a polyolefin and the fire-retardant system of an antimony oxide and halogen compound is blended along with optional ingredients in minor amounts such as nucleating agents, processing aids, colorants, etc.

The blend is then changed to and heated in an extruder or other such apparatus where it is injected with an expanding or foaming agent such as various of the normally gaseous expanding agents, such as polyhalogenated hydro-carbons containing fluorine and chlorine, i.e., Freon 12 and Freon 114 manufactured and sold by E. I. duPont de Nemours Co.

The following examples are given in illustration of the invention:

EXAMPLE I

A polyethylene polymer was blended with a fire-retardant system comprising antimony oxide and a chlorinated paraffin wax in the following percentages by weight:
  92.8% polyethylene (Norchem 952 resin)
  0.8% antimony oxide
  6.4% chlorinated paraffin wax The above blend along with a minor amount of a silicate nucleating agent and a black pigment was charged to a twin screw extruder having the following temperature operating profile:

| Zone 1 | 290° F. |
|--------|---------|
| Zone 2 | 300° F. |
| Zone 3 | 300° F. |
| Die    | 207° F. |

While maintaining a barrel pressure at the die of about 2200 lbs./in$^2$ at a flow rate of approximately 60 lbs./hr., an expanding agent comprising Freon 114 was injected into the blend at a rate of approximately 15 lbs/100 lbs. of polymer.

The foam product produced had a thickness of about ½ inch and a density of about 2.5 to 3.0 lbs/ft.$^3$

EXAMPLE II

The procedure of Example I was repeated, however, the blend of polyethylene/antimony oxide/chloronated paraffin wax was such that the rates of chlorinated paraffin wax/antimony oxide was 13/1.

The foam product produced had a thickness of about ½ inch and a density of about 3.3 to 4.0 lbs/cu. ft.

EXAMPLE III

The procedure of Example I was repeated, however, the blend of polyethylene/antimony oxide/chlorinated paraffin wax was such that the rates of chlorinated paraffin wax/antimony oxide was 3/1.

The foam product produced had a thickness of about ½ inch and a density of about 3.3 to 4.0 lbs/cu. ft.

EXAMPLE IV

Flame retardant testing was conducted on the materials produced in Examples I, II and III per ASTM Test D1692 in a modified 45° angle attitude. The results are as follows:

From product of Example I—Self-extinguishing in 48.7 sec. with a burn of 2.6 inches;

From product of Example II—Continuous burning for 60 seconds with dripping and a burn of 3.54 inches;

From product of Example III—Continuous burning for 60 seconds with dripping and a burn of 2.84 inches.

As will be noted from the burn results, the foam product of Example I is within the scope of the present invention while the foam product of Examples II and III are outside of the scope of the present invention.

EXAMPLE V

The experiment of Example I was repeated using Rexene 143 polyethylene resin. The resulting product had a thickness of about ½ inch and a density of about 2.8 lbs/cu. ft.

The results of the ASTM 1692 45° modified burn test showed that the foam product was self-extinguishing in 12.4 seconds

Having thus described the invention, what is claimed is:

1. A low density fire-retardant foam comprising a foamed blend of a polyolefin polymer, an antimony oxide and a halogenated wax wherein the ratio of said halogenated wax to said antimony oxide is from about 7:1 to 9:1 by weight.

2. Fire retardant foam according to claim 1 wherein said polyolefin polymer comprises at least 90% by weight of said blend.

3. Fire retardant foam according to claim 2 wherein said blend further includes a nucleating agent and a normally gaseous expanding agent.

4. A fire retardant foam according to claim 2 wherein said polyolefin polymer is polyethylene and said halogenated wax is a chlorinated paraffin wax.

5. Fire retardant foam according to claim 2 wherein said ratio of said halogenated wax to said antimony oxide is 8:1 by weight.

6. Fire retardant foam according to claim 4 wherein said polyethylene is present in an amount of about 92.8% by weight, and chlorinated paraffin wax is present in an amount of about 6.4% by weight and said antimony oxide is present in an amount of about 0.8% by weight.

7. Fire retardant foam according to claim 3 wherein said normally gaseous expanding agent is a polyhalogenated hydrocarbon.

* * * * *